US012124703B2

United States Patent
Choi et al.

(10) Patent No.: US 12,124,703 B2
(45) Date of Patent: Oct. 22, 2024

(54) MEMORY, DATA PROCESSING DEVICE INCLUDING MEMORY

(71) Applicant: LX SEMICON CO., LTD., Daejeon (KR)

(72) Inventors: Sang Dae Choi, Daejeon (KR); Na Young Jo, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 26 days.

(21) Appl. No.: 18/059,146

(22) Filed: Nov. 28, 2022

(65) Prior Publication Data

US 2023/0195318 A1 Jun. 22, 2023

(30) Foreign Application Priority Data

Dec. 21, 2021 (KR) .................. 10-2021-0183281

(51) Int. Cl.
*G06F 3/06* (2006.01)

(52) U.S. Cl.
CPC ............ *G06F 3/0613* (2013.01); *G06F 3/064* (2013.01); *G06F 3/0673* (2013.01)

(58) Field of Classification Search
CPC ...... G06F 3/0613; G06F 3/064; G06F 3/0673; G06F 3/0611; G06F 3/0659; G06F 3/0679; G09G 3/20; G09G 5/18; G09G 2300/0842; G09G 2310/08
USPC .................................................. 711/154, 100
See application file for complete search history.

(56) References Cited

U.S. PATENT DOCUMENTS

| 9,001,883 | B2 | 4/2015 | Tsai | |
|---|---|---|---|---|
| 10,257,084 | B2 | 4/2019 | Mogul | |
| 2023/0128777 | A1* | 4/2023 | Park ...................... | G09G 3/006 345/214 |
| 2023/0168828 | A1* | 6/2023 | Lee ........................ | G06F 3/061 711/154 |

* cited by examiner

*Primary Examiner* — David Yi
*Assistant Examiner* — Zubair Ahmed
(74) *Attorney, Agent, or Firm* — Greenberg Traurig, LLP (57) ABSTRACT

A data processing device according to one embodiment of the present disclosure includes: a memory including at least one unit block composed of a setting information block configured to store setting information required for processing an image signal and a header configured to store basic information about the setting information; and a setting controller configured to receive the setting information from the memory, wherein the setting controller includes: a memory map configured to store the setting information received from the memory; a memory controller configured to sequentially request the basic information and the setting information stored in the at least one unit block; and a setting information signal output unit configured to generate and output a setting information signal and an enable signal corresponding to each unit block using the basic information and the setting information received through the memory controller.

10 Claims, 4 Drawing Sheets

MEMORY, DATA PROCESSING DEVICE INCLUDING MEMORY

CROSS-REFERENCE TO RELATED APPLICATIONS

This application claims the benefit of the Korean Patent Applications No. 10-2021-0183281 filed on Dec. 21, 2021, which are hereby incorporated by reference as if fully set forth herein.

FIELD OF THE INVENTION

The present specification relates to a memory, a data processing device including the memory.

BACKGROUND

A liquid crystal display (LCD) using liquid crystals, an organic light-emitting diode (OLED) display using an organic light-emitting diode, and the like are representative display devices which display an image.

Recently, with the development of semiconductor manufacturing technology and the development of image processing technology, the expansion of commercialization and supply of display elements capable of easily reducing a weight and a thickness of the display device and realizing high definition is rapidly proceeding.

SUMMARY

The present disclosure is directed to providing a data processing device for reducing the time required to read a memory and a display driving device including the same.

A data processing device according to one embodiment of the present disclosure includes: a memory including at least one unit block composed of a setting information block configured to store setting information required for processing an image signal and a header configured to store basic information about the setting information; and a setting controller configured to receive the setting information from the memory, wherein the setting controller includes: a memory map configured to store the setting information received from the memory; a memory controller configured to sequentially request the basic information and the setting information stored in the at least one unit block; and a setting information signal output unit configured to generate and output a setting information signal and an enable signal corresponding to each unit block using the basic information and the setting information received through the memory controller.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display device including a data processing device according to one embodiment of the present disclosure will be described in detail with reference to FIG. 1.

Figure 1:
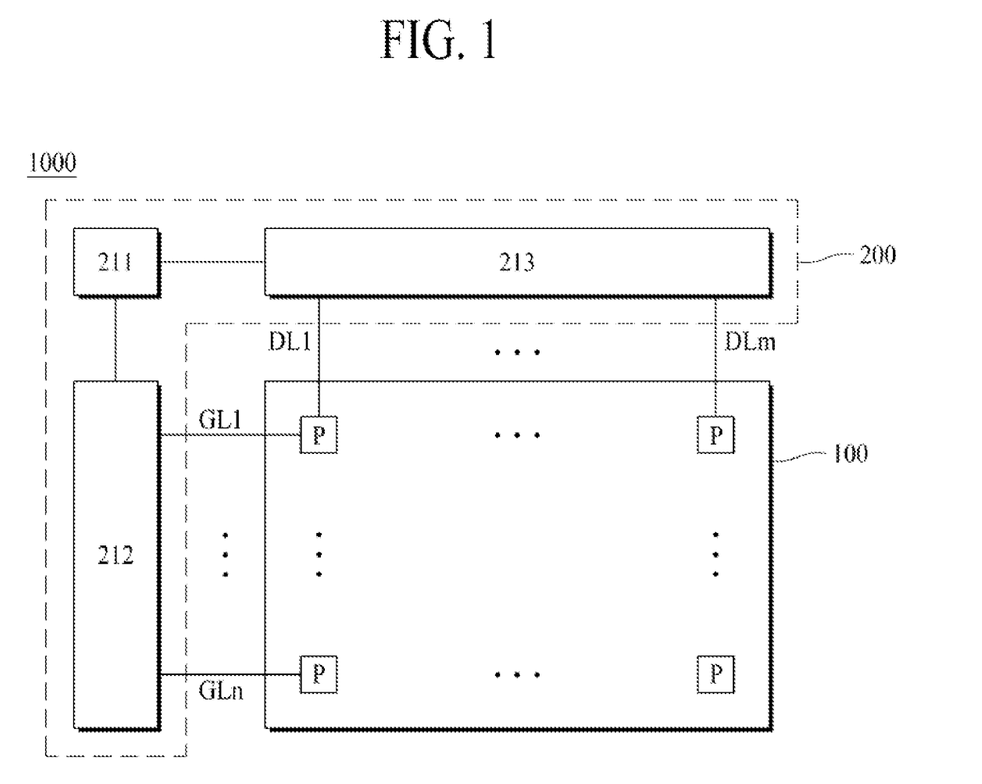
FIG. 1 is a configuration diagram of a display device including a display driving device according to one embodiment of the present disclosure.

FIG. 1 is a configuration diagram of a display device including a display driving device according to one embodiment of the present disclosure.

Referring to FIG. 1, a display device 1000 according to one embodiment of the present disclosure includes a display panel 100 and a display driving device 200. Although not shown in the drawings, the display device 1000 according to one embodiment of the present disclosure may further include a touch driving device.

The display device 1000 is provided to perform a display function, and may be implemented as a flat panel display such as a liquid crystal display (LCD) or an organic light-emitting diode (OLED) display.

The display panel 100 includes a plurality of gate lines GL1 to GLn, a plurality of data lines DL1 to DLm, and a plurality of pixels P.

Each of the plurality of gate lines GL1 to GLn receives a gate pulse (or scan pulse). Each of the plurality of data lines DL1 to DLm receives a data signal. The plurality of gate lines GL1 to GLn and the plurality of data lines DL1 to DLm are disposed to respectively intersect on a substrate to define the plurality of pixels P. Although not shown in the drawings, each of the plurality of pixels P may include a thin film transistor (not shown) connected to a gate line GLi and a data line DLj which are adjacent thereto, a pixel electrode (not shown) connected to the thin film transistor, a storage capacitor (not shown) connected to the pixel electrode, and a parasitic capacitor (not shown) formed between the gate line GLi and the data line DLj.

The display driving device 200 includes a data processing device 210, a gate driver 220, and a data driver 230. According to one embodiment of the present disclosure, the data processing device 210 includes a timing controller. Although, the data processing device 210 is shown independent on the gate driver 220 and the data driver 230, the data processing device 210 may include at least one of the timing controller, the gate driver 220 and the data driver. In addition, the data processing device 210 may be the SoC (System on Chip) which may include at least one of the timing controller, the gate driver 220 and the data driver.

The data processing device 210 receives various timing signals including a vertical synchronization signal, a horizontal synchronization signal, a data enable signal, a clock signal, and the like from an external host system (not shown) to generate a gate control signal GCS for controlling the gate driver 220 and a data control signal DCS for controlling the data driver 230. Further, the data processing device 210 receives an image signal from the external system, and converts the image signal to an image signal in a form which may be processed by the data driver 230 and outputs the converted image signal.

Meanwhile, the data processing device 210 may generate an internal data enable signal by compressing an external data enable signal transmitted from the host system within a preset period.

According to one embodiment of the present disclosure, the data processing device 210 may include a setting controller which stores setting information required to output the gate control signal GCS, the data control signal DCS, and the image signal.

In this case, the external host system converts digital image data to a format suitable to be displayed on the display panel 100 and transmits the digital image data to the data processing device 210 together with the timing signals. The host system is implemented as any one among a television system, a set-top box, a navigation system, a digital video disk (DVD) player, a Blu-ray player, a personal computer (PC), a home theater system, and a phone system to receive an input image.

The gate driver 220 receives the gate control signal GCS from the data processing device 210. The gate control signal GCS may include a gate start pulse, a gate shift clock, a gate output enable signal, and the like. The gate driver 220 generates gate pulses synchronized with the data signal through the received gate control signal, and shifts the generated gate pulses to sequentially supply the gate pulses to the gate lines GL1 to GLn. To this end, the gate driver 220 may include a plurality of gate drive ICs (not shown). The gate drive ICs sequentially supply the gate pulses synchronized with the data signal to the gate lines GL1 to GLn under control of the data processing device 210 to select the data line on which the data signal is written. The gate pulse swings between a gate high voltage and a gate low voltage.

The data driver 230 receives the data control signal DCS and the image signal from the data processing device 210. The data control signal DCS may include a source start pulse, a source sampling clock, a source output enable signal, and the like. The source start pulse controls a data sampling start timing of n source drive ICs (not shown) constituting the data driver 230. The source sampling clock is a clock signal which controls a sampling timing of data in each of the source drive ICs. The source output enable signal controls an output timing of each source drive IC.

Hereinafter, the data processing device according to one embodiment of the present disclosure will be described in detail with reference to FIGS. 2 to 5.

Figure 2:
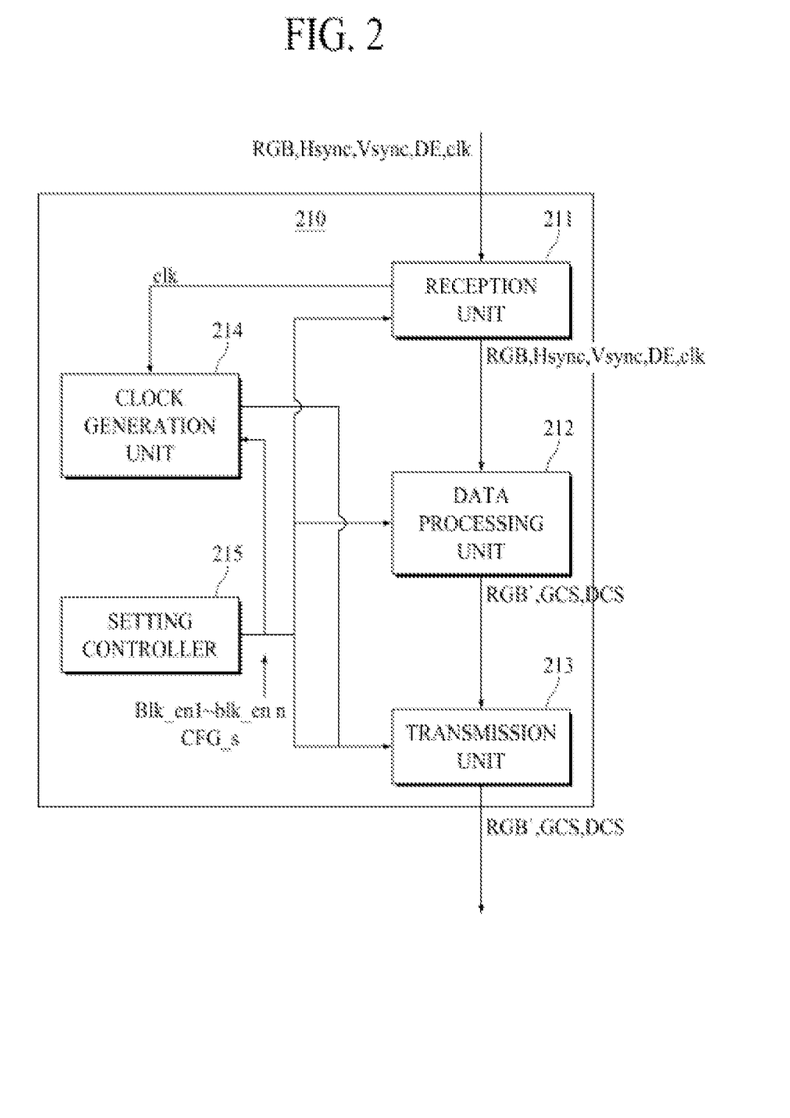
FIG. 2 is a configuration diagram of a data processing device according to one embodiment of the present disclosure.
Figure 3:
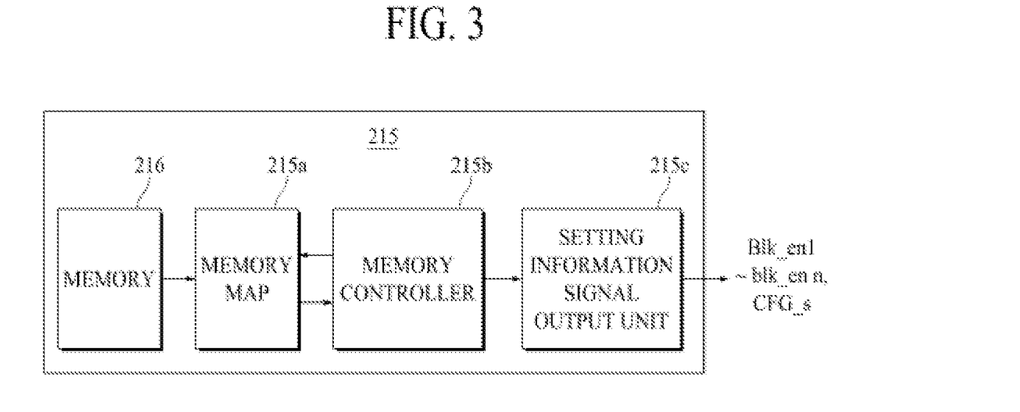
FIG. 3 is a block diagram of a setting controller including a memory according to one embodiment of the present disclosure.
Figure 4:
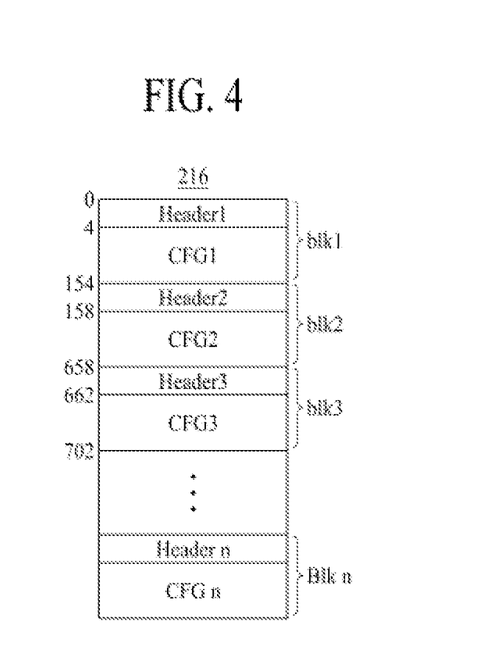
FIG. 4 is a view illustrating a structure of the memory according to one embodiment of the present disclosure.
Figure 5:
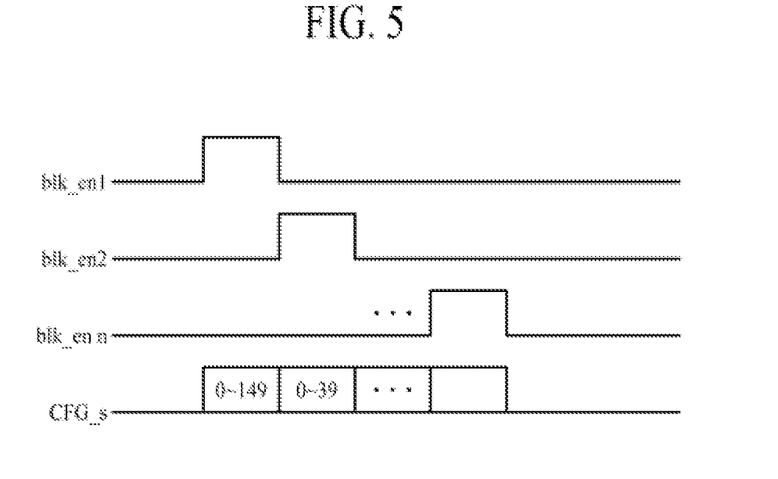
FIG. 5 is a view illustrating a signal transmitted between setting controller including the memory, and functional blocks of the data processing device according to one embodiment of the present disclosure.

FIG. 2 is a configuration diagram of the data processing device according to one embodiment of the present disclosure, and FIG. 3 is a block diagram of the setting controller including a memory according to one embodiment of the present disclosure. FIG. 4 is a view illustrating a structure of the memory according to one embodiment of the present disclosure, and FIG. 5 is a view illustrating a signal transmitted between functional blocks of the data processing device and the setting controller including the memory according to one embodiment of the present disclosure.

Referring to FIG. 2, the data processing device 210 according to one embodiment of the present disclosure includes a reception unit 211, a data processing unit 212, a transmission unit 213, a clock generation unit 214, and a setting controller 215.

As described above, the reception unit 211 receives a data signal RGB, vertical/horizontal synchronization signals Vsync and Hsync, a data enable signal DE, and a clock signal clk from the external host system, and provides the signals to the data processing unit 212 and the clock generation unit 214. Specifically, the reception unit 211 provides the data signal RGB to the data processing unit 212 and provides the clock signal clk to the clock generation unit 214.

The data processing unit 212 may convert a format to correspond to a data channel configuration and a data signal protocol using the received data signal RGB. For example, the data processing unit 212 may correct the received data signal RGB, and convert the format of the corrected data signal in units of frames to a format to be displayed on the display panel 100 to output a converted image signal RGB'.

Further, the data processing unit 212 may generate the data control signal DCS and the gate control signal GCS based on the vertical/horizontal synchronization signals Vsync and Hsync, the data enable signal DE, and the clock signal clk.

The transmission unit 213 outputs the image signal RGB', the gate control signal GCS, and the data control signal DCS generated by the data processing unit 212.

Although not shown in the drawings, the transmission unit 213 is connected to n source drive ICs. In this case, the transmission unit 213 and the source drive ICs may transmit a signal using a single-ended signaling method using one line or a differential signaling method in which a signal is displayed by a voltage difference between two lines using the two lines.

The clock generation unit 214 supplies a clock of a required frequency to the data processing unit 212 using the input clock signal clk. In this case, the clock generation unit 214 fixes a phase of the clock signal so that the clock signal is output at a predetermined period. To this end, the clock generation unit 214 may include a phase-locked loop circuit PLL.

The setting controller 215 transmits a setting information signal to the corresponding functional block. Specifically, the setting controller 215 may transmit the corresponding setting information signal to the reception unit 211, the data processing unit 212, the transmission unit 213, or the clock generation unit 214. To this end, the setting controller 215 includes a memory map 215a, a memory controller 215b, and a setting information signal output unit 215c. Further, the setting controller 215 may further include a memory 216.

When power is applied, the memory map 215a receives setting information from the memory 216. Such setting information may be stored in the memory map 215a of the setting controller 215, and the setting information stored in the memory map 215a may be provided to functional blocks of the reception unit 211, the data processing unit 212, the transmission unit 213, and the clock generation unit 214.

The memory 216 may store the setting information required for the data processing device 210 to process the image signal, and may provide the stored setting information to the data processing device 210.

As described above, the memory 216 may be included in the setting controller 215 of the data processing device 210. However, the present disclosure is not limited thereto, and the memory 216 may be located in the data processing device 210 in a region other than the setting controller 215, or may also be located in the display driving device 200 in a region other than the data processing device 210.

The memory 216 may include an arbitrary memory among various volatile memories or non-volatile memories including (but are not limited to) a random-access memory (RAM), such as a synchronous dynamic random-access memory (SDRAM), a read-only memory (ROM), a non-volatile random-access memory (NVRAM), an electrically erasable programmable read-only memory (EEPROM), a FLASH memory, and the like. The memory 216 may further store instructions and program code executed by a processor as part of performing the various techniques described in the present disclosure.

The memory 216 includes a plurality of unit blocks blk1 to blk n as shown in FIG. 4.

A unit block blk may include setting information required for each functional block of the device including the setting controller 215 to perform a function and basic information about the setting information. Specifically, the unit block blk may include setting information for each functional block which receives the setting information signal from the setting controller 215 and basic information about the setting information. For example, each unit block blk may store setting information required for driving each of the reception unit 211, the data processing unit 212, the transmission unit 213, and the clock generation unit 214.

According to one embodiment of the present disclosure, the unit blocks blk may be classified according to the functional block which receives the setting information signal from the setting controller 215. For example, a first unit block blk1 stores basic information about the first unit block blk1 and the setting information required for driving the reception unit 211, a second unit block blk2 stores basic information about the second unit block blk2 and the setting information required for driving the data processing unit 212, a third unit block blk3 stores basic information about the third unit block blk3 and the setting information required for driving the transmission unit 213, and an nth unit block blk n stores basic information about the nth unit block blk n and the setting information required for driving the clock generation unit 214.

As described above, the unit blocks blk may be divided into different sizes. Since the unit blocks blk according to one embodiment of the present disclosure are divided based on the size of the setting information required for driving the functional blocks respectively corresponding to the unit blocks, the time and memory required to read a region where the setting information included in the memory 216 is not stored may be optimized.

The unit blocks blk respectively include headers Header1 to Header n and setting information blocks CFG1 to CFG n. In this case, since the header is located at a front end of the setting information block CFG in each unit block blk, the memory controller 215b, which will described below, may receive information stored in the header Header before information stored in the setting information block CFG.

According to one embodiment of the present disclosure, the header Header includes basic information about the corresponding unit block blk. Specifically, the basic information may include functional block information which is information about the functional block corresponding to the setting information included in the corresponding unit block blk, output size information which is size information of setting information to be output among information stored in the setting information block CFG, and last unit block information which indicates whether the corresponding unit block blk is the last unit block. That is, the header Header may include the information about the functional block corresponding to the setting information included in the corresponding unit block blk, the output size information which is size information of setting information to be output among information stored in the setting information block CFG, and the last unit block information which indicates whether the corresponding unit block blk is the last unit block. In this case, the header Header n of the nth unit block blk n which is the last unit block may include information which refers that the corresponding unit block is the last unit block as the last unit block information.

Since the header Header includes the output size information which is size information of the setting information to be output among information stored in the setting information block CFG, unlike a conventional memory structure composed of unit blocks having an initially set size in design, in the memory according to one embodiment of the present disclosure, the size of the unit block may be changed to store the setting information having a smaller or larger size than an initially set size in design. For example, when the setting information having a size smaller than the size of the setting information initially set in design is stored, a region not including the setting information should also be read in the conventional memory structure, but according to one embodiment of the present disclosure, since the unit block has a size corresponding to the size of the setting information and thus does not include the region where the setting information is not stored, the time and memory required to read the region where the setting information is not stored may be optimized.

The setting information block CFG stores the setting information required for a functional block corresponding to the corresponding unit block blk to perform a function. For example, as described above, the first unit block blk1 stores the basic information about the first unit block blk1 in a first header Header1, and stores the setting information required for the reception unit 211 to perform a function in a first setting information block CFG1, the second unit block blk2 stores the basic information about the second unit block blk2 in a second header Header2, and stores the setting information required for the data processing unit 212 to perform a function in a second setting information block CFG2, the third unit block blk3 stores the basic information about the third unit block blk3 in a third header Header3, and stores the setting information required for the transmission unit 213 to perform a function in a third setting information block CFG3, and the nth unit block blk n stores the basic information about the nth unit block blk n in an nth header Header n, and stores the setting information required for the clock generation unit 214 to perform a function in an nth setting information block CFG n.

The memory controller 215b sequentially receives the information stored in the unit block blk of the memory 216 by requesting the setting information stored in the memory 216.

According to one embodiment of the present disclosure, the memory controller 215b determines whether to terminate a request for the setting information stored in the memory using the basic information of the corresponding unit block blk included in the header Header. That is, the memory controller 215b determines whether to terminate the request for the setting information after receiving the setting information of the corresponding unit block blk using the basic information of the corresponding unit block blk included in the header Header. Specifically, the memory controller 215b analyzes the last unit block information included in the header Header to receive the setting information stored in the corresponding unit block blk, and then determines whether to request the information stored in the unit block blk corresponding to the next unit block blk. For example, when the header Header 1 of the first unit block blk1 includes information which refers that the corresponding block is not the last block as the last unit block information, the memory controller 215b receives the information stored in the first unit block blk1, and then requests the information stored in the second unit block blk2, which is the next unit block. Meanwhile, when the memory controller 215b analyzed that the information which refers that the corresponding unit block is the last block as the last unit block information is included in the header Header n of the nth unit block blk n which is the last unit block, the setting information for the corresponding unit block may be requested, and then the request for the setting information may be terminated.

Further, according to one embodiment of the present disclosure, the memory controller 215b determines the size of the information to be requested from the setting information block CFG of the corresponding unit block blk using the basic information of the corresponding unit block blk included in the header Header. Specifically, the memory controller 215b may request as much information as output size information from the beginning of the corresponding unit block blk using the output size information which is size information of the setting information required for the corresponding functional block to perform a function among information stored in the setting information block CFG included in the header Header. For example, as shown in FIG. 4, when the header Header1 of the first unit block blk1 includes "150" as the output size information, the memory controller 215b may request setting information from 0 to 149 of a first setting information block CFG1 based on a relative address for the first setting information block CFG1. Accordingly, since only the setting information required to perform a function among the setting information stored in the setting information block CFG of the corresponding unit block blk may be requested and read, the time required to read a region where the setting information is not stored may be reduced.

The setting information signal output unit 215c receives the setting information stored in the memory 216 through the memory controller 215b, and generates and outputs enable signals blk_en1 to blk_en n and a setting information signal CFG_s for each block using the received information. Specifically, the setting information signal output unit 215c receives information stored in the headers Header of the unit blocks blk to analyze the basic information of the corresponding unit block blk. That is, the setting information signal output unit 215c acquires the functional block information which is information about the functional block corresponding to the setting information included in the corresponding unit block blk, the output size information which is size information of information to be requested among the setting information stored in the setting information block CFG, and the last unit block information which indicates whether the corresponding unit block blk is the last unit block. The setting information signal output unit 215c generates the enable signal and the setting information signal CFG_s corresponding to each functional block using the acquired functional block information, output size information, and last unit block information. For example, when the header Header 1 of the first unit block blk1 includes the information about the reception unit 211 as the information about the functional block, includes "150" as the output size information, and includes the information which refers to the second unit block blk2 as the next unit block information, as shown in FIG. 5, the setting information signal output unit 215c transmits the setting information stored from the relative address "0" to "149" of the first unit block blk1 as the setting information signal CFG_s together with the enable signal blk_en1 for the first unit block blk1. Accordingly, when the reception unit 211 receives a first enable signal blk_en1 corresponding to the first unit block blk1 and the reception unit 211, the reception unit 211 receives the setting information signal CFG_s received together with the first enable signal blk_en1, and thus is driven using the received setting information signal CFG_s.

When the header Header 1 of the first unit block blk1 includes information which refers that the corresponding block is not the last unit block as the last unit block information, the memory controller 215b receives the information stored in the first unit block blk1, and then requests the information stored in the second unit block blk2, which is the next unit block. Accordingly, when the header Header2 of the second unit block blk2 includes the information about the data processing unit 212 as the information about the functional block, includes "40" as the output size information, and includes the information which refers that the corresponding block is not the last unit block as the last unit block information, as shown in FIG. 5, the setting information signal output unit 215c transmits the setting information stored from the relative address "0" to "39" of the second unit block blk2 as the setting information signal CFG_s together with an enable signal blk_en2 for the second unit block blk2. Accordingly, the data processing unit 212 receives the setting information signal CFG_s together with the enable signal blk_en2 when receiving the enable signal blk_en2 corresponding to the second unit block blk2 and the data processing unit 212, and thus is driven using the received setting information signal CFG_s. That is, the enable signal blk_en2 and the setting information signal CFG_s are synchronized and output, and the data processing unit 212, which is the functional block, is driven using the setting information signal CFG_s received simultaneously with the enable signal blk_en2.

According to one embodiment of the present disclosure, the memory 216 may be divided according to the size of setting information to be stored, and may include the header Header including the basic information about the stored setting information to optimize the time required for reading by requesting the setting information required for driving the data processing device 210 and the display driving device 200 from the memory 216.

A memory, a data processing device including the memory, and a display driving device including the data processing device according to the present disclosure can optimize the time required to read setting information of the data processing device and display driving device.

It will be apparent to those skilled in the art that various changes and modifications may be made without departing from the spirit and scope of the disclosure.

In addition, at least a part of the methods described herein may be implemented using one or more computer programs or components. These components may be provided as a series of computer instructions through a computer-readable medium or a machine-readable medium, which includes volatile and non-volatile memories. The instructions may be provided as software or firmware and may be entirely or partially implemented in a hardware configuration such as application specific integrated circuits (ASICs), field programmable gate arrays (FPGAs), digital signal processors (DSPs), or other similar devices. The instructions may be configured to be executed by one or more processors or other hardware components, and when one or more processors or other hardware components execute the series of computer instructions, one or more processors or other hardware components may entirely or partially perform the methods and procedures disclosed herein.

Therefore, it should be understood that the above-described embodiments are not restrictive but illustrative in all aspects. The scope of the present disclosure is defined by the appended claims rather than the detailed description, and it should be construed that all alternations or modifications derived from the meaning and scope of the appended claims and the equivalents thereof fall within the scope of the present disclosure.

What is claimed is:

1. A data processing device comprising:
a memory including unit blocks composed of a setting information block configured to store setting information required for processing an image signal and a header configured to store basic information about the setting information;
a setting controller configured to receive the setting information from the memory, and
first and second functional blocks,
wherein the setting controller includes:
a memory map configured to store the setting information received from the memory;
a memory controller configured to sequentially request the basic information and the setting information stored in the unit blocks; and
a setting information signal output unit configured to generate and output a setting information signal and an enable signal corresponding to the unit blocks using the basic information and the setting information received through the memory controller,
wherein the memory includes a first unit block including setting information for driving the first functional block and a second unit block including setting information for driving the second functional block, and
the setting information signal output unit generates an enable signal corresponding to each functional block and a setting information signal synchronized with the enable signal to output the enable signal and the setting information signal to each functional block.

2. The data processing device of claim 1, wherein the basic information includes last unit block information which indicates whether the corresponding unit block is a last unit block.

3. The data processing device of claim 2, wherein unit blocks other than the last unit block among the unit blocks include information which indicates that the corresponding unit blocks are not the last unit block.

4. The data processing device of claim 2, wherein
the memory controller receives information stored in the first unit block and then requests information stored in the second unit block when the last unit block information of the first unit block includes information which indicates that the corresponding unit block is not the last unit block.

5. The data processing device of claim 2, wherein
the memory controller receives information stored in the first unit block and then terminates a request for the setting information when the last unit block information of the first unit block includes information which indicates that the corresponding unit block is the last unit block.

6. The data processing device of claim 1, wherein the basic information includes output size information which is size information of information to be output among information stored in the setting information block.

7. The data processing device of claim 6, wherein
the output size information of the each of the unit blocks includes information which refers to x (x is a positive integer), and
the memory controller requests information stored in 0 or more and x−1 or less based on a relative address for a first setting information block.

8. The data processing device of claim 1, wherein the basic information includes functional block information, which is information about a functional block corresponding to the setting information included in the corresponding unit block.

9. A data processing device comprising:
- a memory including at least one unit block composed of a setting information block configured to store setting information required for processing an image signal and a header configured to store basic information about the setting information;
- a setting controller configured to receive the setting information from the memory; and
- first and second functional blocks,
- wherein the setting controller includes:
- a memory map configured to store the setting information received from the memory;
- a memory controller configured to sequentially request the basic information and the setting information stored in the at least one unit block; and
- a setting information signal output unit configured to generate and output a setting information signal and an enable signal corresponding to the at least one unit block using the basic information and the setting information received through the memory controller,
- wherein the basic information includes functional block information, which is information about a functional block corresponding to the setting information included in the corresponding unit block,
- wherein the memory includes a first unit block including setting information for driving the first functional block and a second unit block including setting information for driving the second functional block,
- wherein the setting information signal output unit generates a setting information signal including a first enable signal corresponding to the first unit block and the first functional block and a first setting information signal synchronized with the first enable signal to output the setting information signal to the first functional block when the first unit block includes information which refers to information about the first functional block as the functional block information, and
- wherein the setting information signal output unit generates a setting information signal including a second enable signal corresponding to the second unit block and the second functional block and a second setting information signal synchronized with the second enable signal to output the setting information signal to the second functional block when the second unit block includes information which refers to information about the second functional block as the functional block information.

10. The data processing device of claim 9, wherein the first functional block simultaneously receives the first enable signal and the first setting information signal when the first enable signal is received, and
- the second functional block simultaneously receives the second enable signal and the second setting information signal when the second enable signal is received.

* * * * *